United States Patent
Driscoll

[15] 3,660,025
[45] May 2, 1972

[54] MANUFACTURE OF PIGMENTARY SILICA

[72] Inventor: Richard E. Driscoll, Monroe, La.
[73] Assignee: Cities Service Company, New York, N.Y.
[22] Filed: July 1, 1970
[21] Appl. No.: 51,632

[52] U.S. Cl. .............................23/182 V, 23/1 B, 23/153, 23/182 P, 23/202 V
[51] Int. Cl. ...................................C01b 33/18, C01b 33/14
[58] Field of Search ................23/182, 182 V, 182 P, 202 V, 23/153, 1 B

[56] References Cited

UNITED STATES PATENTS

| | | |
|---|---|---|
| 3,069,282 | 12/1962 | Allen..............................23/202 V X |
| 3,086,851 | 4/1963 | Wagner...........................23/202 V X |
| 3,130,008 | 4/1964 | Stokes et al............................23/140 |
| 2,886,414 | 5/1959 | Secord..................................23/182 V |
| 3,419,351 | 12/1968 | Zirngibl et al...................23/182 V X |

*Primary Examiner*—Edward Stern
*Attorney*—J. Richard Geaman

[57] ABSTRACT

A mixture of fluid fuel and oxygen is burned at a substantially constant rate to produce hot flame gases. Silicon tetrafluoride is commingled with these hot gases and is thus hydrolyzed. The concentration of silicon tetrafluoride in the hydrolysis mixture is established at a selected value which corresponds in direct proportion to the surface area desired of the silica product, i.e., the surface area of the silica is increased by raising the concentration of silicon tetrafluoride in the hydrolysis mixture, and vice versa.

9 Claims, 2 Drawing Figures

SiF₄ + H₂O

AIR + FUEL GAS

SECONDARY AIR

COOLING AIR

FIG. 1

SILICA AEROSOL

INVENTOR.
RICHARD E. DRISCOLL
BY
ATTORNEY

MANUFACTURE OF PIGMENTARY SILICA

BACKGROUND OF THE INVENTION

This invention pertains to manufacture of amorphous, pigmentary silicon dioxide, hereinafter referred to as "fumed silica," which is produced by hydrolysis of silicon tetrafluoride at elevated temperatures, e.g., in excess of about 1,100° F. The most widely utilized technique for achieving the hydrolysis has been flame processes wherein a fluid fuel is burned with a free oxygen-containing gas in the presence of the silicon tetrafluoride, water for the reaction being supplied by combustion of the fuel or from an external source. The resulting silicas generally have a particle size within the range of about 5–50 millimicrons and a surface area within the range of about 75–200 square meters per gram. After formation, the silica is separated by filtration from gaseous products of the reaction, e.g., hydrogen fluoride, water vapor and $CO_2$, and is recovered as a dry, low density powder. Among other uses, such silicas can be employed as reinforcing agents for silicone rubber, as thickeners for resins and greases, and as anticaking agents for powders.

End-use applications for fumed silicas continue to develop and it has become increasingly apparent that the actual surface area of a silica, as measured by nitrogen (B.E.T.), has more effect upon its behavior and performance in use than does the particle size. As a result, the need arose for a method of regulating the surface area of fumed silica formed by flame hydrolysis of silicon tetrafluoride, whereby a variety of grades can be produced which are characterized mainly by a difference in surface area, each grade having a specific but significantly different surface area within the range of about 200–500 m²/gm. (B.E.T.). Heretofore, surface area could not be easily regulated since the ability to alter the particle size of the silica being produced (a factor in surface area control) has been very limited. Furthermore, there was no known method for imparting sufficient surface roughness or porosity to the particles whereby surface area could be altered independently of particle size.

SUMMARY OF THE INVENTION

It is therefore an object of this invention to provide a method whereby the surface area of fumed silica, produced by hydrolysis of silicon tetrafluoride, can be regulated over a broad range. Other objects and advantages of the invention will become apparent from the following description and the appended claims.

In accordance with the present invention, a mixture of fluid fuel and oxygen is burned at a substantially constant rate to produce hot flame gases which reside in a hydrolysis zone. Silicon tetrafluoride is mixed with these hot gases and is thus hydrolyzed, thereby forming fumed silica. To provide a silica having a preselected surface area, it is essential that the concentration of silicon tetrafluoride in mixture with the flame gases in the hydrolysis zone be established at a selected value which corresponds in direct proportion to the surface area desired, for it has been discovered that the surface area of the silica increases proportionately as the concentration of silicon tetrafluoride in the mixture is raised, and vice versa. The concentration of silicon tetrafluoride in the hydrolysis mixture can be altered, of course, by changing the rate at which either the hot flame gases or the silicon tetrafluoride is introduced into the hydrolysis zone, but since it is usually desirable to generate the flame gases at substantially the same rate in each operation, the introduction rate of the silicon tetrafluoride can be altered, or, the concentration of silicon tetrafluoride in the hydrolysis mixture can be changed by concomitant introduction of diluent vapors, e.g., water vapor and HF, at a rate which establishes a selected concentration of silicon tetrafluoride in the mixture for the formation of a silica having a specific surface area. The use of diluent vapors in mixture with silicon tetrafluoride provides the advantage of being able to maintain a maximum silica production rate during each operation since this technique obviates reduction of the silicon tetrafluoride feed rate for regulating the surface area of the silica produced.

In regulating surface area in accordance with the invention, the exact concentration of silicon tetrafluoride which is required in the hydrolysis mixture for production of a fumed silica having a specific surface area is somewhat variable depending on the temperature of the hydrolysis reaction, this being affected to some extent by the type and amount of fuel employed. As a general rule, however, the constituents which are formed into the reaction mixture should be proportioned to provide a preselected mass ratio of flame reactants and diluents to silicon tetrafluoride which is within the range about 10 to about 110, thereby permitting the formation of silicas having a particle size within the range of about 5 to about 15 millimicrons and a specifically desired surface area within the range of about 200 to about 500 m²/gm. Flame reactants are fuel and oxygen, while diluents include water vapor, hydrogen fluoride and nitrogen, the latter being introducable as air and whereby oxygen is also supplied for combustion of the fuel. Other vapors which do not enter substantially into the combustion or hydrolysis reaction can also serve as diluents, e.g., carbon dioxide and the so-called inert gases.

The amount of fuel which is burned in the flame is subject to variation, but should in any case be sufficient in quantity to effect a temperature in the hydrolysis zone whereby conversion of the silicon tetrafluoride to silica is reasonably efficient, e.g., an efficiency of at least about 75 percent, and preferably higher. The temperature within the hydrolysis zone can, therefore, range upwards from 1,800° F when a complete-combustion flame process is employed, but high yields of silica can also be accomplished in the practice of this invention at temperatures of about 1,600° F or less by means of an incomplete-combustion flame process, this being the subject of another invention described in my co-pending patent application Ser. No. 51,622 and filed July 1, 1970. In accordance with the process disclosed therein, a mixture comprising oxygen, a hydrocarbon fuel and silicon tetrafluoride is burned, the amount of oxygen in the mixture being insufficient for complete combustion of the fuel. A substantial portion of the silicon tetrafluoride is hydrolyzed within the resulting incomplete-combustion hydrocarbon flame, oxygen being added thereafter for combustion of the remaining fuel therein. Probably because of free radical initiation in the incomplete-combustion flame, the conversion efficiency of silicon tetrafluoride to silica can be maintained at high levels while temperatures remain below the fusion-sintering point of the silica, i.e., not in excess of about 1,600° F. Accordingly, the co-efficient, $\phi$, should be in excess of about 1.0, and to particular advantage should be within the range of about 1.3 to about 1.8 where:

$$\phi = \frac{\text{Volume percent of fuel gas in actual mixture (V.F.G.)}}{\text{Stoichiometric amount of fuel gas, volume percent (S.F.G.)}}$$

Any suitable fuel can be employed for producing the hot flame gases which are utilized in the hydrolysis reaction, e.g., carbon monoxide, hydrogen, natural gas, methane, ethane, butane, propane, and mixtures thereof, but hydrogen or normally gaseous hydrocarbon fuels should be utilized with the aforesaid incomplete-combustion flame process. Oxygen may be supplied for mixture with the fuel as substantially pure oxygen, air, air enriched with oxygen or any other suitable free oxygen-containing gas.

As previously indicated, the silicon tetrafluoride can be passed into the hydrolysis zone while mixed with the preselected amount of diluent vapor, thus providing means for regulating the concentration of silicon tetrafluoride in the hydrolysis mixture. Suitable diluents for this purpose include water vapor, hydrogen fluoride, inert gases, and mixtures thereof. When using air to supply oxygen to the flame, the content of silicon tetrafluoride and diluent vapor in the mixture can, to advantage, be proportioned to provide a specific mol fraction of silicon tetrafluoride therein which is within the range of about 0.02 to about 0.14. Thus, a specific concentration of silicon tetrafluoride in the hydrolysis mixture can be established whereby the silica produced has a selected surface area within the range of about 200 to about 500 m²/gm.

When water is employed as a diluent vapor in mixture with silicon tetrafluoride, the mixture is stable within the range of just above dew point to about 600° F, and the mixture should, therefore, be maintained within this range prior to introduction into the hydrolysis zone.

Any suitable method may be employed for generating the silicon tetrafluoride. When it is desirable to supply the silicon tetrafluoride to the hydrolysis zone in mixture with water, a generation process as described in U.S. Pat. Nos. 3,233,969 or 3,273,963 can be used to advantage, and it should be pointed out that silicon tetrafluoride-water vapor mixtures can thus be produced which contain mol fractions of silicon tetrafluoride which are within the aforesaid desirable range, and can be regulated by adjusting the concentration of aqueous hydrofluoric acid that is vaporized and fed to the silicon tetrafluoride generator. When the silicon tetrafluoride is available as a substantially dry gas, proportioned quantities of water vapor or another diluent vapor can be mixed with it when it is desirable to provide a diluted silicon tetrafluoride feedstream.

Hydrolysis of silicon tetrafluoride in accordance with the present invention results in formation of an aerosol of the silica suspended in combustion gases and hydrogen fluoride. The silica is then recovered from these gases by means of known techniques, e.g., after cooling, the aerosol is passed into a bag filter wherein the silica is separated at a temperature of about 450°-500° F.

BRIEF DESCRIPTION OF THE DRAWINGS

FIG. 1 is a horizontal view, in section, of a hydrolysis reactor which can be used in the practice of the invention.

DESCRIPTION OF PREFERRED EMBODIMENTS

Figure 2:
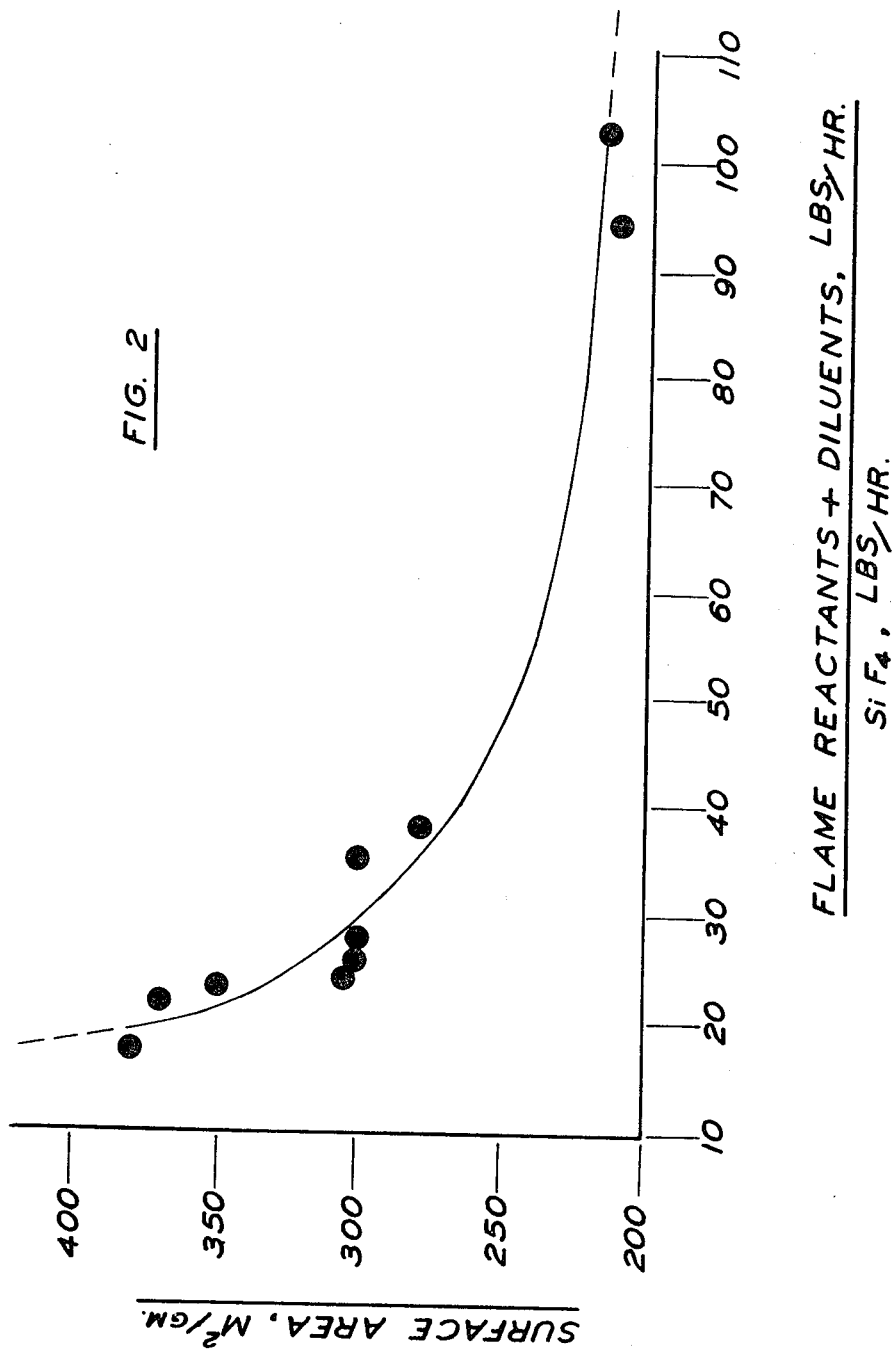
FIG. 2 shows surface area of the silica product plotted against silicon tetrafluoride concentrations which can exist in the hydrolysis mixture when producing fumed silica in accordance with the invention.

With reference to FIG. 1, a hydrolysis chamber 1 is enclosed by a metal wall 2 having tapered inlet and outlet ends represented at 3 and 4, respectively. A burner for forming an incomplete-combustion flame is generally represented at 5. The burner comprises a barrel 6 with a somewhat enlarged discharge end which contains a refractory flame stabilizer ring 7. A mixture of primary air and hydrocarbon fuel gas is fed to the burner barrel 6 through conduit 8 while a mixture of silicon tetrafluoride and water vapor is introduced axially through conduit 9. The resultant mixture of air, fuel, silicon tetrafluoride and water vapor is ignited at the discharge end of the burner and burns as a flame which is generally represented at 10. Secondary air, for combustion of the fuel components which reside in the flame after burning of the fuel-rich hydrolysis mixture, is introduced introduced tangentially into a burner shroud 11 through conduit 12. A silica aerosol thus forms in chamber 1 by hydrolysis of the silicon tetrafluoride. The aerosol is removed from the chamber through conduit 13 and is conveyed therein to cooling and collection units for recovery of the silica. The metal wall 2 of the hydrolysis chamber is provided with a cooling jacket 14 into which cooling air is introduced through conduit 15 and is removed therefrom through conduit 16.

In operation, a fuel-rich mixture of air and fuel gas, i.e., whereby $\phi$ is in excess of about 1.0, is introduced into the burner through conduit 8 at a constant rate. At the same time, silicon tetrafluoride in mixture with water vapor is fed to the burner through conduit 9, the mixture being proportioned to provide a selected mol fraction of silicon tetrafluoride therein which is within the range of about 0.02 to about 0.14 for control of the surface area of the silica product. A fuel supply rate is selected which will provide a temperature of not in excess of about 1,600° F in the hydrolysis zone.

The hydrolysis reaction mixture, being rich in fuel, burns as a relatively cool elongated flame along the center-line of the hydrolysis chamber. Since, however, the secondary air is introduced in a manner so that it surrounds the flame rather than being quickly and forcefully mixed with it, substantial combustion hydrolysis of the silicon tetrafluoride occurs in a region of the flame wherein combustion of the fuel is substantially incomplete. As a consequence, unburned fuel is subjected within this region to thermal cracking and/or only partial reaction with oxygen whereby free radicals are formed which survive long enough or reaction in manner which does not exist in a hot, fast flame, thus effecting high yields of silica at unusually low temperatures. The temperature within the region of the flame wherein incomplete combustion and substantial hydrolysis occurs may, for instance, be within the range of only about 1,200°-1,400° F, whereas the temperature may increase to 1,600° F in the region wherein combustion of the fuel is completed by the addition of oxygen.

In order to produce a fumed silica having a particle size of 5-15 millimicrons and a specific surface area within the range of about 200-500 m²/gm., the feed rate of silicon tetrafluoride is established to provide a specific mass ratio of flame reactants and diluents to silicon tetrafluoride of within the range of about 10 to about 110. In the illustrated case, the flame reactants and diluents are the air and fuel gas introduced through conduit 8, the secondary air introduced through line 12, and the water vapor introduced through line 9. Other reactants and diluents can be introduced into the hydrolysis chamber when it is preferrable and practical to do so.

EXAMPLES

Using a hydrolysis reactor substantially as shown in FIG. 1, ten experiments were run at varied conditions in order to produce fumed silicas characterized, in the main, by a difference in surface area. Methane was burned as a fuel, while the silicon tetrafluoride feedstreams were produced substantially in accordance with the process as described in U.S. Pat. No. 3,233,969, using aqueous hydrofluoric acids of different concentrations to produce feedstreams which contained various concentrations of silicon tetrafluoride in water and HF diluent vapors. Run conditions which were employed in each experiment are shown in Table I. Each of the silicas thus produced had a mean particle diameter within the range of 5-15 millimicrons and the indicated surface areas within the range of about 200 to about 400 m²/gm. In FIG. 2, the mass

TABLE 1

| Experiment | Primary air, s.c.f.h. | Primary fuel gas, s.c.f.h. | Primary ratio | Primary and secondary air, s.c.f.h. | Total ratio | Air, lbs./hr. | Fuel gas, lbs./hr. | SiF₄, lbs./hr. | HR and H₂O, lbs./hr. | Reactants and diluents/ SiF₄, mass ratio | Mol fraction, SiF₄/ H₂O+HF | Surface area of silica produced, M²/gm. |
|---|---|---|---|---|---|---|---|---|---|---|---|---|
| 1 | 1,590 | 196 | 8.12 | 3,000 | 15.3/1 | 224 | 8.9 | 17.39 | 28.41 | 15.02 | 0.097 | 379 |
| 2 | 1,685 | 193 | 8.70 | 3,052 | 15.6/1 | 226 | 8.8 | 12.13 | 23.77 | 21.31 | 0.082 | 372 |
| 3 | 1,811 | 249 | 7.30 | 3,152 | 12.6/1 | 235 | 11.4 | 12.1 | 22.6 | 22.23 | 0.084 | 350 |
| 4 | 1,904 | 211 | 9.03 | 2,919 | 13.8/1 | 218 | 9.6 | 10.39 | 33.51 | 25.51 | 0.051 | 306 |
| 5 | 2,321 | 259 | 8.96 | 2,783 | 10.7/1 | 208 | 11.8 | 9.1 | 20.0 | 26.35 | 0.073 | 300 |
| 6 | 1,720 | 196 | 8.76 | 3,000 | 15.3/1 | 224 | 8.9 | 9.28 | 23.12 | 27.5 | 0.067 | 300 |
| 7 | 2,600 | 250 | 10.4 | 3,000 | 12/1 | 224 | 7.68 | 7.68 | 29.12 | 34.44 | 0.064 | 297 |
| 8 | 2,290 | 263 | 8.70 | 3,969 | 14.3/1 | 296 | 11.9 | 8.78 | 25.62 | 37.98 | 0.056 | 280 |
| 9 | 2,330 | 262 | 8.90 | 4,070 | 15.5/1 | 304 | 11.9 | 3.34 | 24.06 | 101.78 | 0.023 | 213 |
| 10 | 2,330 | 264 | 8.80 | 4,055 | 15.4/1 | 302 | 12 | 3.62 | 25.82 | 93.87 | 0.024 | 210 | ratios of flame reactants and diluents to silicon tetrafluoride which were employed in these experiments is shown as a plot against surface area of the silicas produced. As can be seen from Table I and FIG. 2, a silica having a specific surface area is produced by preselection of a specific mass ratio, higher surface area being produced by means of lower ratios (higher concentrations of silicon tetrafluoride), and vice versa.

While this invention has been described with reference to particular materials, conditions, apparatus and the like, it will nonetheless be understood that various changes and modifications can be made which are within the spirit and scope of the invention as defined by the appended claims.

Therefore, what is claimed is:

1. A process for producing pigmentary silicon dioxide having a particle diameter within the range of abut 5 to about 15 millimicrons and a surface area (BET) within the range of about 200 $m^2/gm$ to about 500 $m^2/gm$ which comprises:
   a. mixing a fluid fuel, an amount of oxygen which is insufficient for complete combustion of said fuel, a diluent vapor, and silicon tetrafluoride followed by
   b. igniting the fuel in the resulting mixture in a hydrolysis chamber and then introducing additional oxygen into the mixture after the ignition of the fuel, the amount of additional oxygen being sufficient for completing the combustion of said fuel,
   c. the mass ratio of flame reactants and diluents to silicon tetrafluoride introduced into said hydrolysis chamber being established at a specific value within the range of about 10 to about 110,
   d. hydrolyzing said silicon tetrafluoride in said chamber and producing a silica having a surface area within the higher end of the previously indicated surface area range when said specifically established mass ratio is at a value within the lower end of the previously indicated mass ratio range and producing a silica having a relatively lower surface area when the said mass ratio is increased beyond said specifically established value,
   e. conveying the resulting silica aerosol out of said hydrolysis zone and recovering the silica from the aerosol.

2. The process of claim 1 wherein said additional oxygen is introduced into the mixture in the form of air.

3. The process of claim 1 wherein the silicon tetrafluoride is introduced into the hydrolysis chamber in mixture with a diluent vapor.

4. The process of claim 3 wherein the mol fraction of silicon tetrafluoride in the diluted mixture is within the range of about 0.02 to about 0.14.

5. The process of claim 3 wherein the diluent vapor is selected from the group consisting of water vapor, hydrogen fluoride, and mixtures thereof.

6. The process of claim 1 wherein the oxygen which is mixed with said fuel is supplied for mixture therewith in the form of a gas selected from the group consisting of substantially pure oxygen, air enriched with oxygen, and air.

7. The process of claim 1 wherein the fluid fuel is a normally gaseous fuel.

8. The process of claim 7 wherein the fluid is selected from the group consisting of carbon monoxide, hydrogen, methane, ethane, propane, butane, natural gas, and mixtures thereof.

9. The process of claim 1 wherein the fuel gas during step (a) is in excess with respect to the oxygen to the extent that the stoichiometric fraction, $\phi$, is within the range of about 1.3 to about 1.8 where:

$$\phi = \frac{\text{Volume percent of fuel gas in actual mixture (V.F.G.)}}{\text{Stoichiometric amount of fuel gas, volume percent (S.F.G.)}}$$

* * * * *